Aug. 12, 1969
W. M. COLE
3,460,686
SHIP CARGO HANDLING SYSTEM
Filed April 24, 1967
4 Sheets-Sheet 1
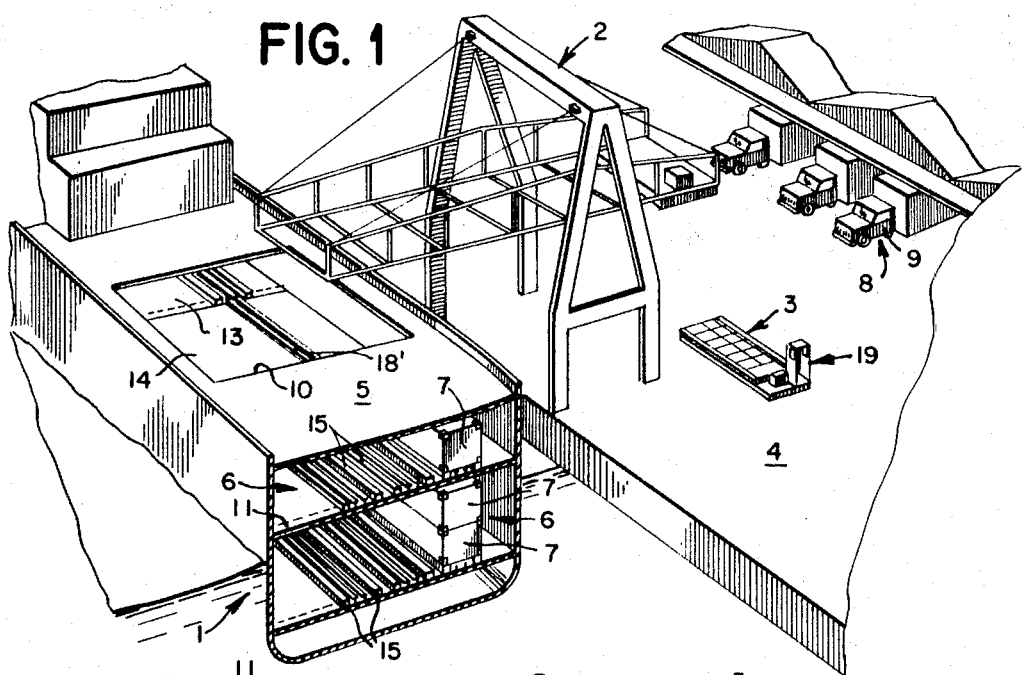
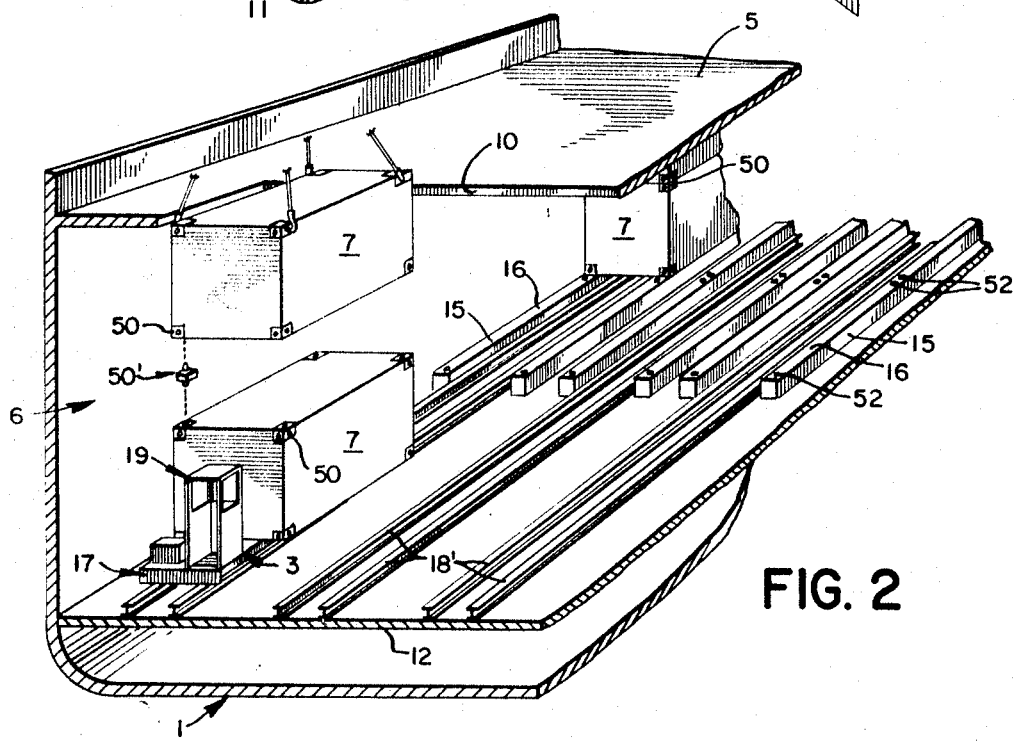
INVENTOR
WILLIAM M. COLE
BY
*Pennie, Edmonds, Morton, Taylor and Adams*
ATTORNEYS Aug. 12, 1969 W. M. COLE 3,460,686
SHIP CARGO HANDLING SYSTEM
Filed April 24, 1967 4 Sheets-Sheet 2
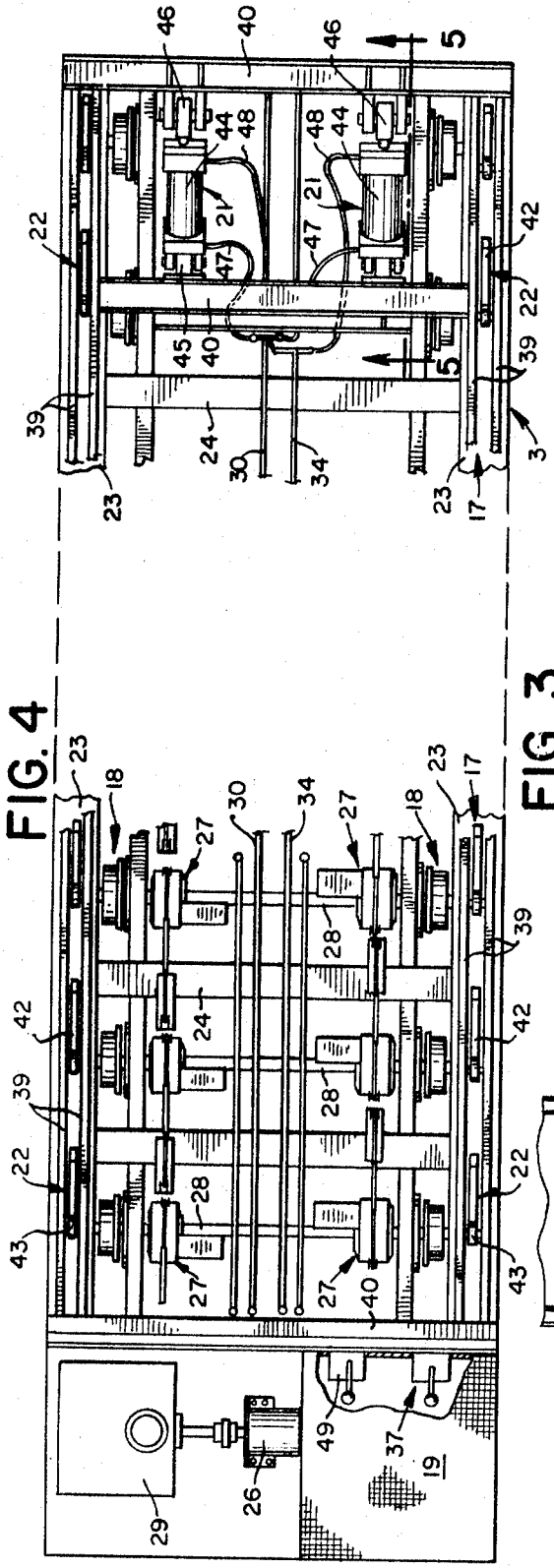
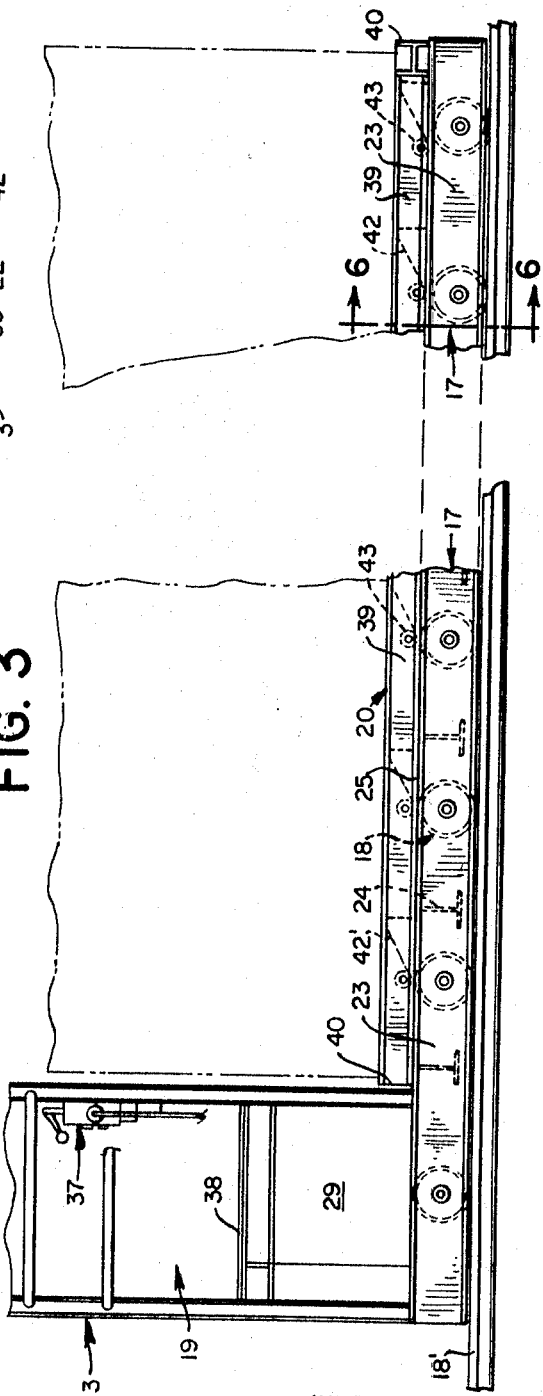
INVENTOR
WILLIAM M. COLE
BY
ATTORNEYS Aug. 12, 1969     W. M. COLE     3,460,686
SHIP CARGO HANDLING SYSTEM
Filed April 24, 1967     4 Sheets-Sheet 3

INVENTOR
WILLIAM M. COLE

BY
ATTORNEYS

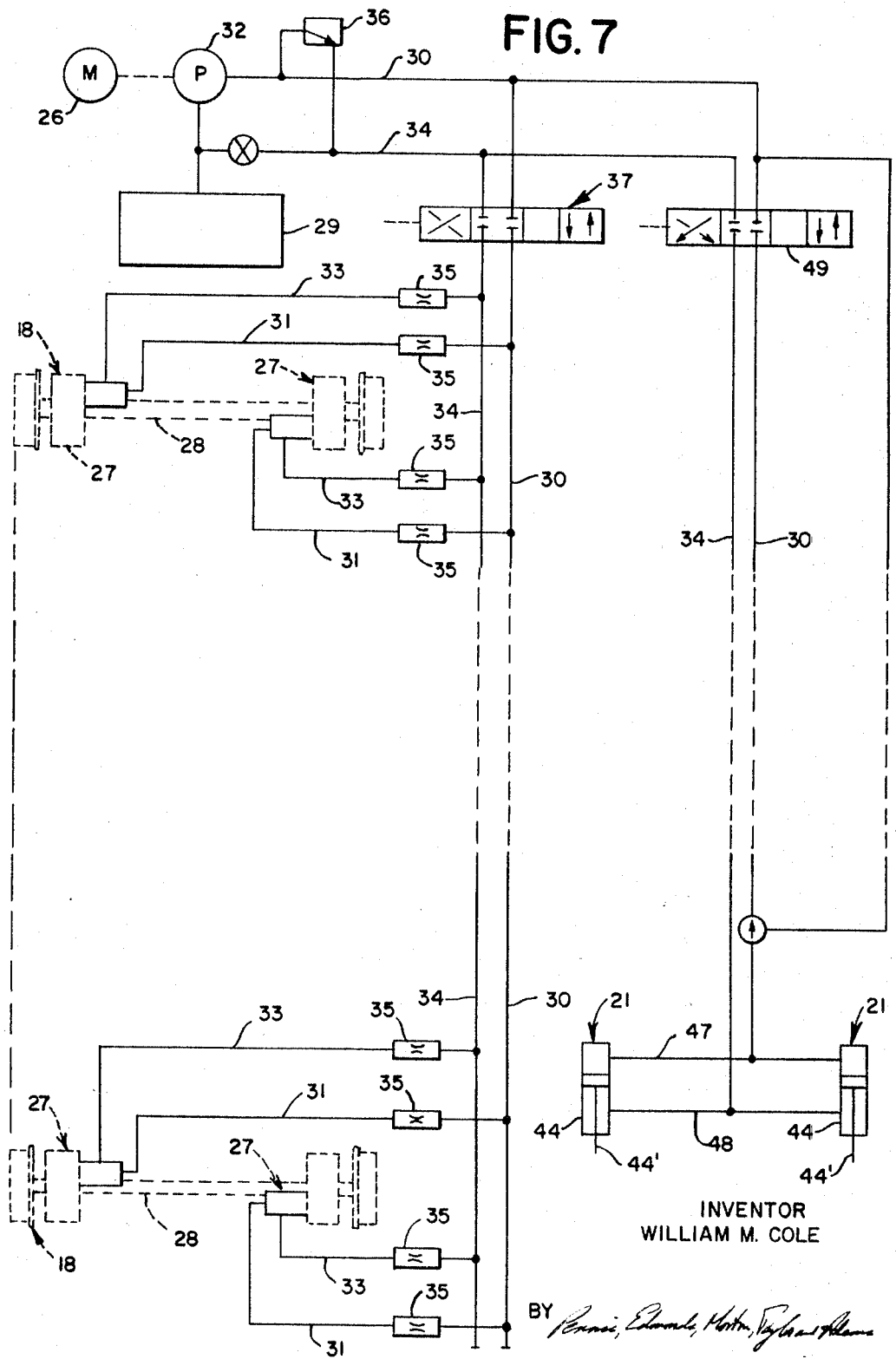

3,460,686
SHIP CARGO HANDLING SYSTEM
William M. Cole, Metuchen, N.J., assignor to Seatrain Lines, Inc., Edgewater, N.J., a corporation of Delaware
Filed Apr. 24, 1967, Ser. No. 632,954
Int. Cl. B63b 27/10
U.S. Cl. 214—14   8 Claims

ABSTRACT OF THE DISCLOSURE

A system for loading and unloading cargo in a ship at dockside including a cargo transporter for supporting the cargo and moving it within the storage area of the ship, a crane positioned at dockside for lifting the transporter into and out of the storage area of the ship and for transferring cargo between the dock and the transporter located within the ship, and cargo supports in the storage area for receiving cargo from said transporter.

BACKGROUND OF THE INVENTION

Field of the invention

This invention pertains to marine loading and unloading systems and more particularly to a system for loading and unloading cargo on ships at dockside where all the loading apparatus remains on shore while the ship loaded with cargo is at sea.

Description of the prior art

In conventional ship loading and unloading systems, the cargo is stored internally of the ship structure in the area bounded by the ship's top deck and hull. This cargo storage area, commonly called the hold of the ship, may comprise one or more decks below the top deck of the ship; and a hatchway extending vertically through the top deck and each of the lower decks provides access to the cargo storage area on each deck. In the typical loading and unloading systems used with ships of this type, one or more cranes or other cargo lifting devices are provided on the top deck of the ship; and during a ship loading operation, these cranes are used to lift the cargo off the adjacent dock and lower it down through the hatchway to the desired cargo storage deck. The cargo is then released and moved along the storage deck to the location where it is to be stored. In unloading a ship, the cranes are used in a reverse manner to remove cargo brought from the storage area to the hatchway and deposit it on the adjacent dock. With conventionally designed ships, these cranes are not only operated from the top deck of the ship but are constructed as a permanent part of the ship structure. This has the disadvantage of requiring that each ship of a fleet of ships be provided with its own cargo lifting cranes; and since such cranes must remain with the individual ships while at sea, they are thus of no use during this time as far as handling cargo on other ships is concerned.

In addition to the deck cranes of conventionally designed ships, separate cargo moving apparatus is provided for each of the storage decks for moving the cargo laterally along the deck and into the desired storage location. Where the cargo being loaded or unloaded its large and heavy as in the case of cargo containers such as truck trailer sections of conventional land vehicles which can measure eight feet wide, forty feet long and eight feet high and weigh in the neighborhood of thirty tons apiece, handling and positioning thereof within the storage area of the ship becomes quite laborious and time consuming. To accommodate such cargo, the ship may be provided on each storage deck with hoisting devices supported on overhead rails for lifting the cargo containers received on that deck and carrying them one at a time laterally away from the hatchway to be stored. Alternatively, the storage decks may be provided with conveyor systems for moving the cargo laterally of the deck, or as still another alternative, massive dolly-like supports may be used for directly receiving the cargo as it is lowered through the hatchway.

Cargo moving apparatus of any of the types described above is either typically bulky, expensive to install and maintain or cumbersome to operate. Also, such apparatus like the ship deck cranes is constructed as a permanent part of the ship in the sense that it remains with the ship while at sea. As with the deck cranes, this requires that each ship of a fleet be provided with its own cargo moving apparatus thus adding to the expense of operating the fleet. In addition, however, this apparatus is stored in the hold of the ship while the ship is at sea and thus takes up valuable storage space that could otherwise be profitably used carrying cargo.

In attempting to overcome the disadvantages encountered with conventional loading and unloading systems where the cargo is to be comprised of the truck trailer sections of land vehicles or other similar cargo containers, ships have been specifically designed to eliminate the need for lateral movement of the cargo once placed within the hold of the ship. To accomplish this, the various storage decks of the ship are eliminated so that the cargo containers may be lowered, by way of the cranes on the upper deck, directly into the desired location where they are to be stored. With this procedure, a number of cargo containers are usually stacked one upon the other by the ship's deck crane so as to permit full use of the storage area. Ships designed in this way are not, however, very well suited for receiving other types of cargo where this stacking arrangement is found to be undesirable. Also, ships of this construction still include as part of the cargo handling apparatus the deck cranes which form a permanent part of the ship and thus add to the expense of outfitting a fleet of these ships.

SUMMARY OF THE INVENTION

In accordance with the teachings of the present invention, a ship cargo handling system particularly adapted for handling trailer cargo sections of land vehicles is provided. This system is simple in construction and operation, requires no cargo moving apparatus that must be left on the ship while at sea and is well suited for loading and unloading ships having either a number of cargo storage decks or those which have been constructed with only one storage deck. The loading system of the present invention includes essentially two pieces of apparatus, namely a cargo lifting crane and a cargo transporter. The crane is operated from dockside while the cargo transporter is a self-propelled unit adapted to be lowered into the hold of the ship by the dockside crane for handling the cargo within the ship.

In construction, the transporter is provided with a cargo receiving platform having a width less than the width of the cargo containers to be stored; and the platform is adapted to hold such cargo in either single or stacked orientation. The transporter is also provided with its own lifting mechanism for raising and lowering the cargo receiving platform through a designated stroke to effect removal of the cargo from the platform. For cooperating with the transporter to permit the removal of cargo therefrom by a single raising and lowering of the cargo platform, raised cargo supports are provided in the storage area of the ship. These supports are spaced laterally from each other by a distance greater than the width of the transporter platform but less than the width of the cargo containers and are thus adapted to hold the cargo containers along the side undersurfaces thereof which extend beyond the sides of the transporter platform. To deposit the cargo in the storage area and free the transporter for another load, the transporter with the cargo receiving platform raised is moved in between the cargo supports with the sides of the cargo overlying the supports. Next, the platform is lowered until the weight of the cargo is transferred from the transporter to the supports. Once this has occurred, the transporter is then withdrawn from underneath the stored cargo and used for handling the next load of cargo.

In loading a ship in accordance with the teachings of the present invention, the lifting crane is first positioned on the dock in working orientation relative to the ship hatchway and then used to transfer the cargo transporter from the dock, down through the hatchway to the desired storage deck. After the transporter has been released, the crane is used to transfer the cargo containers from the dock to the cargo platform of the transporter. Depending on the internal construction of the ship's storage are, thea cargo containers are positioned on the transporter one at a time for separate placement in the storage area of the ship or are stacked on the platform one upon the other. In either case, the loaded transporter is then moved to the designated storage location for that load and the cargo removed by lowering it onto the cargo supports of the ship. The cargo transporter is then returned to the hatchway for another load and this sequence of steps is repeated until the ship is loaded. At the completion of the loading operation, the crane is used to remove the cargo transporter from the ship so that it, together with the dockside crane, may be advantageously put to use loading or unloading other ships.

BRIEF DESCRIPTION OF THE DRAWINGS

FIG. 1 is a perspective view, partially in cross section, of the ship cargo handling system of the present invention;

FIG. 2 is a perspective view on a portion of the storage area of a ship;

FIG. 3 is a side elevation of the cargo transporter of the present invention;

FIG. 4 is a plan view of the transporter shown in FIG. 3;

FIG. 7 is a schematic view of the hydraulic system of the transporter shown in FIGS. 3 and 4.

DESCRIPTION OF THE PREFERRED EMBODIMENTS

Figure 5:
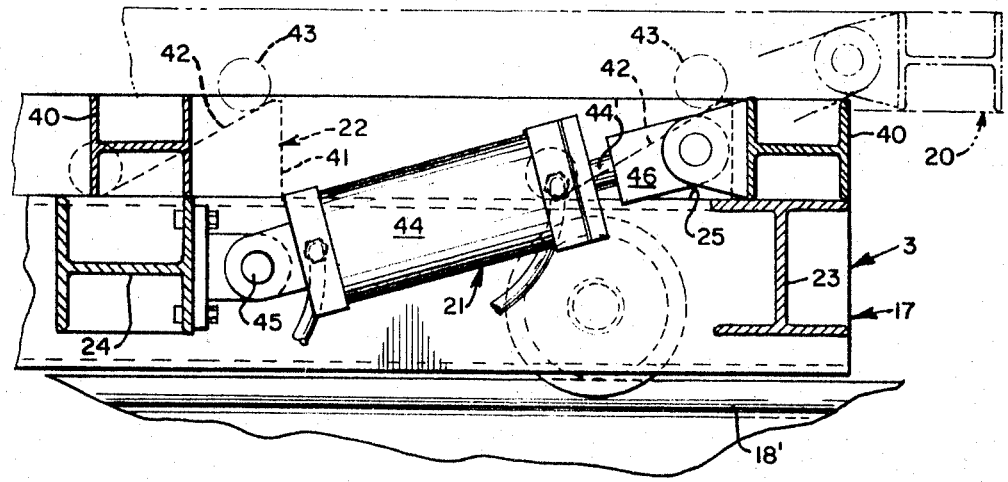
FIG. 5 is an enlarged sectional view of the hydraulic lifting mechanism of the transporter taken along lines 5—5 of FIG. 4.

The cargo handling system of the present invention as used for loading and unloading a ship such as shown at 1 in FIG. 1 generally comprises two types of working equipment, namely a crane 2 and a cargo transporter 3. The crane 2 is positioned on the adjacent dock 4 in working orientation relative to the ship's top deck 5 while the transporter is adapted to be positioned within the storage area 6 of the ship, as shown in FIG. 2, for handling cargo 7 received therein. The cargo handling system of the present invention is particularly constructed for handling box-shaped cargo like the trailer sections of land-operated trailer trucks 8. These trailer sections shown at 7 in FIGS. 1 and 2 are first detached from the underlying frame and wheel supports 9 of the truck 8 before being stored in the ship.

The storage area of the ship extends on both sides of the ship's hatchway 10 and may include a number of lower storage decks 11 as shown in FIG. 1 or a single storage deck 12 as shown in FIG. 2. Where the ship is constructed with a number of storage decks, each such deck will be provided with an opening 13 aligned with the hatchway 10 and removable cover 14 for the opening. In both the single and multiple storage deck ships, the storage locations where the cargo is to be stored are of the same construction and generally include pairs of spaced cargo support means in the form of shelf members 15 having upper cargo supporting surfaces 16 spaced above the storage deck. Each shelf member of each pair is spaced laterally from each other by a distance less than the width of the cargo to be stored so as to support the cargo along its side undersurfaces as most clearly shown in FIG. 2. Several pairs of cargo support shelves are preferably provided across the width of the ship on each of the storage decks for storing the cargo in end-to-end relation and in either a single layer arrangement as shown on the top storage deck in FIG. 1 or in a stacked arrangement as shown on the lower storage deck in FIG. 1 and as shown in FIG. 2.

In loading a ship, the crane 2 is first used to transfer the cargo transporter 3 from the dock down to the desired storage deck of the ship. Thereafter, with the transporter positioned in a cargo receiving location in the storage area, the crane is attached to a cargo container 7 and this container is lowered onto the transporter. If the cargo is to be stacked as in the lower deck of the ship shown in FIG. 1 or as shown in FIG. 2, the crane places the next container or containers directly on top of the first container that was loaded onto the transporter. The transporter is then moved into the desired storage location of the ship, the cargo removed, and the transporter returned to its receiving location for the next load. This sequence of steps is then repeated until the ship has been loaded with the desired cargo, after which the crane is used to remove the transporter from the ship. In a ship unloading operation, the same sequence of steps as described above with respect to loading a ship are used with the exception that the transporter, once lowered into the storage area of the ship, is used to remove cargo from the cargo shelves of the ship and bring it to a position where the dockside crane cas be attached to transfer it to the dock.

To effect the transfer of the cargo from the transporter to the cargo storage area of the ship without requiring additional cargo handling equipment, the transporter is uniquely constructed to operate in conjunction with the spaced cargo support shelves 15 provided in the ship's storage area. Generally, the transporter, as shown in FIGS. 3-6, comprises a rigid primary support member 17 carried by the wheel assemblies 18, an operator's cab 19 mounted at the rear of the transporter, and a movable secondary support member or platform 20 for supporting cargo. In addition, the transporter is provided with a lifting means comprising a pair of piston-cylinder assemblies 21 and a plurality of ramp assemblies 22 for raising and lowering the secondary support member to effect a loading or unloading of the transporter as more fully described below.

As seen from FIGS. 3 and 4, the primary support member 17 is generally rectangular in configuration and comprised of side beam members 23 and cross beam members 24 connected to the side beams as by welding or other suitable means. The upper surface of the beams define an upper primary support surface 25 for supporting the movable secondary support member 20. The wheel assemblies 18 for supporting the transporter on underlying guide rails 18' provided on each of the storage decks of the ship are positioned along the length of the transporter at closely spaced intervals to distribute the weight of the cargo to be carried thereby evenly over the entire length of the transporter. Also, the three rearward-most assemblies are connected to a suitable motor 26 carried at the rear of the transporter while the remaining assemblies are mounted in a free wheeling manner.

As shown in FIGS. 4 and 7, the drive for each of the rear wheel assemblies comprises a pair of suitable hydraulic motors 27 connected to the opposite ends of the axle 28 of each assembly and supplied with hydraulic power from a fluid reservoir 29 by the main hydraulic line 30 and the branch lines 31. The transporter motor 26 runs the pump 32 positioned in the line 30 on the outlet side of the reservoir to pump fluid through the lines 30 and 31 and to each of the wheel assembly motors 27 with the return flow of hydraulic fluid to the reservoir passing through the branch return lines 33 and the main return line 34. Suitable flow control valves 35 are connected into each of the branch lines 31 and 33 while a pressure relief valve 36 is connected across the main lines 30, 34 as will be well understood by those skilled in the art. For controlling the supply of hydraulic fluid to the wheel assembly motors 27, a four-way, four-position control valve 37 is connected into the hydraulic system as shown in FIG. 7; and as seen from FIG. 4, this control valve is conveniently placed within the operator's cab 19 at the front of the operator's platform 38.

The secondary support member 20 of the transporter on which the cargo is adapted to be supported is, like the primary support member 17, comprised of structural side beam members 39 and cross beam members 40. As shown most clearly in FIG. 6, the side beams 39 of the secondary support normally rest on the side beams 23 of the primary support of the transporter so that the weight of the cargo is normally carried by the primary support. In accordance with the teachings of the present invention, the width of the transporter support members and in particular the width of the secondary support member 20 is constructed to be less than the width of the cargo containers 7 which the transporter is to handle. Also, the width of these support members of the transporter is less than the spacing between the pairs of cargo support shelves 15 which are provided in the ship's storage area so that the transporter may move in between these shelves to effect a transfer of the cargo between the transporter and the shelves as more fully described below.

During a transfer of cargo from the transporter to the cargo storage shelves of the ship as is required during a loading operation, the secondary support member of the transporter is raised by actuation of the lifting means to a height where the undersurface of the cargo supported thereby is above the supporting surfaces 16 of the cargo shelves. In this position, the transporter is driven in between these shelves to position the sides of the cargo in overlying relationship with these cargo shelves. Once oriented in this manner, the cargo is transferred to the shelves by lowering the secondary support member until the cargo lowers onto the underlying shelves and frees the transporter of its load. In lifting the cargo from the ship's cargo shelves onto the transporter's secondary support member, as required during a ship unloading operation, the transporter with the secondary member lowered is first moved in between the appropriate cargo shelves in underlying relation with the elevated cargo. The secondary support is then raised through actuation of the lifting mechanism until the weight of the cargo is completely borne by the transporter. The loaded transporter is then ready to move the cargo to the ship's hatchway for removal.

Figure 6:
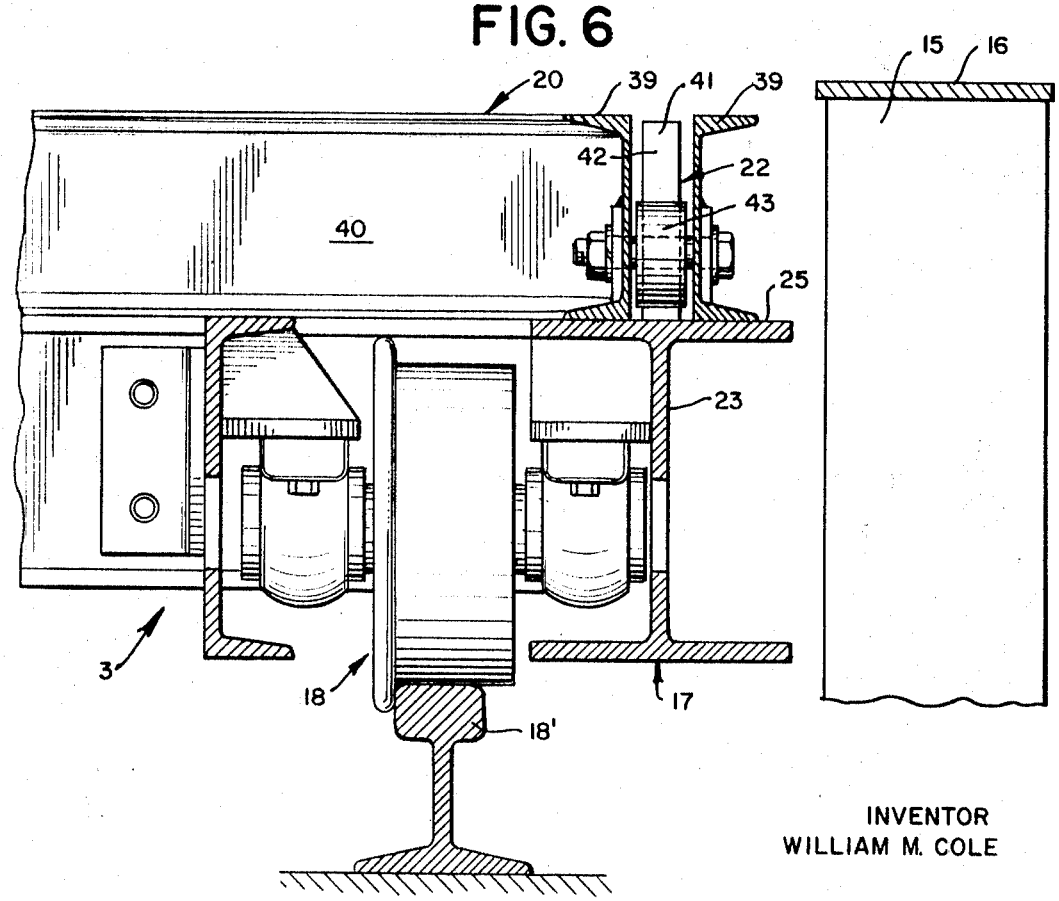
FIG. 6 is an enlarged sectional view of the wheel and ramp assemblies of the transporter taken along lines 6—6 of FIG. 3.

The lifting mechanism of the transporter is most clearly shown in FIGS. 5 and 6. With reference to FIGS. 5 and 6, it is seen that the side beams 23 of the primary support member 17 are provided with a series of ramp members 41 having upwardly and forwardly inclined cam surfaces 42 while the side beams 39 of the secondary support member are provided with cooperating cam follower rollers 43. These ramp assemblies are spaced along the length of the transporter on opposite sides thereof with the lower end of each ramp except for the forwardmost one, lying in vertical alignment with the axle of the underlying wheel assembly (FIG. 3). The forwardmost ramp assembly, on the other hand, has its lower ends disposed slightly behind the underlying wheel assembly; and it is here where the piston-cylinder assemblies 21 of the lifting mechanism are connected.

As shown in FIG. 5, the cylinder member 44 of each piston-cylinder assembly is pivotally connected at 45 to one of the cross beams 24 of the primary support member while its piston rod 44' is pivotally connected at 46 to the front cross beam 40 of the secondary support member. The connection of each of the cylinders to the primary support member is made at a location below and rearwardly of the forwardmost ramp assemblies while the connection of each of the piston rods is made at the forward end of these ramp assemblies. As shown in FIG. 7, each of the piston-cylinder assemblies is connected to the lines 30, 34 of the transporter's hydraulic system by by the branch lines 47, 48; and a four-way, four-position control valve 49 is provided in the operator's cab for regulating the flow of fluid to the cylinder-piston assemblies.

As indicated above, the cargo containers 7 are moved between the dock and hold of the ship by means of the crane 2. For purposes of permitting attachment of the crane to these containers, they are each provided with reinforced apertured corner fittings 50 on their upper surfaces through which the hooking mechanism of the crane may be inserted. In addition, the containers are provided with corner fittings 50 at each of the four corners along their undersurfaces for receiving rotatable shear keys 50'. When connected to the containers, these shear keys extend downwardly of its undersurface to define locking lugs aligned with the upper apertured corner fittings of the containers. During a stacking of the containers, the locking lugs of the upper containers will thus be received in the openings of the corner fittings of the container lying immediately underneath; and these locking lugs may then be rotated by a suitable tool to effect a locking of the containers together. If desired, this arrangement of the shear keys can be reversed and first connected to the upper corner fittings of the containers for reception into the lower corner fittings of the overlying container. This latter arrangement will be used, for example, where the crane is secured to the lower fittings instead of the upper ones.

In storing the containers on the cargo shelves of the ship, it is desirable that they not only be held stationary with respect to each other but that they be held against shifting within the ship. For this purpose, each of the shelves in the storage area of the ship is provided with its own apertured lock fittings 52 appropriately spaced for receiving the locking lugs of the overlying containers.

With the construction of the cargo handling system of the present invention as described above, separate cargo handling apparatus need not be provided for each individual ship of a fleet of ships and no cargo space need be wasted for storing such apparatus on board ships while at sea. In accordance with the teachings of the present invention, the same cargo handling apparatus may be used for loading and unloading all the ships of a fleet of ships more economically and more expeditiously than with conventional systems.

In describing the details of the cargo handling system of the present invention, reference has been made to its presently preferred construction and operation.

I claim:

1. A system for loading and unloading cargo in a ship at dockside comprising:
   (a) a cargo transporter having a cargo support platform with a predetermined width less than the width of the cargo adapted to be positioned thereon;
   (b) a crane located on said dock for lifting said transporter into and out of the cargo storage area of said ship and for loading and unloading cargo onto said transporter when positioned in said cargo area;
   (c) means for moving said transporter back and forth along the floor of said cargo storage area from a first location in working orientation with said crane to a second location where the cargo is to be stored;
(d) fixed cargo support means in said cargo storage area at said second location for receiving said cargo, said cargo support means being positioned at a level spaced from the floor of said cargo storage area and having a pair of shelf members spaced from each other by a distance greater than the predetermined width of said cargo support platform and less than the width of said cargo, said shelf members being disposed in laterally offset relationship with respect to the path of movement of said transporter in said second location and on the opposite sides of said path; and
(e) cargo lifting means positioned on said transporter for selectively lifting cargo to a level above said cargo support means and for selectively lowering cargo onto said cargo support means.

2. A system for loading and unloading cargo in a ship at dockside according to claim 1 wherein:
(a) said cargo transporter is a wheeled vehicle; and
(b) the floor of said cargo storage area includes guide rails extending between said two locations for receiving said wheeled vehicle.

3. A system for loading and unloading cargo in a ship at dockside according to claim 2 wherein:
(a) said shelf members include two separate members disposed in parallel relationship with respect to each other and laterally outwardly of said guide rails on opposite sides thereof.

4. A system for loading and unloading cargo in a ship at dockside according to claim 3 wherein:
(a) said cargo comprises a plurality of box-shaped trailer sections of road vehicles, each of which includes:
(1) means for receiving downwardly extending locking lugs at the four corners thereof on the underneath surface; and
(2) corner lock fittings at the four corners thereof on the upper surface for selectively receiving the locking lugs of another trailer section stacked thereon; and
(b) said shelf members include at least four lock fittings, at least two on each member, for receiving the lugs of any one of said trailer sections disposed thereon.

5. A system for loading and unloading cargo trailer sections of road vehicles in a ship at dockside comprising:
(a) a cargo transporter including:
(1) a rigid primary support member of general rectangular configuration having opposite sides, front and rear ends and an upper primary supporting surface;
(2) wheel means for carrying said primary support member; said wheel means including pairs of axially aligned wheels spaced longitudinally of said primary support member from one end thereof to the other;
(3) a movable secondary support member positioned on the supporting surface of said primary support member and having an upper cargo supporting surface of a width less than the width of said cargo;
(4) lifting means for raising said secondary support member to a predetermined height above said primary support member;
(b) a crane located on said dock for lifting said transporter into and out of the cargo storage area of said ship and for loading and unloading cargo onto said transporter when positioned in said cargo storage area;
(c) guide rails positioned on the floor of the cargo storage area of said ship for receiving the wheel means of said transporter, said guide rails extending from a first location in working orientation with said crane to a second location where the cargo is to be stored;
(d) fixed cargo support means in said cargo storage area at said second location for receiving said cargo, said cargo support means including:
(1) a pair of shelf members disposed laterally outwardly of said guide rails on opposite sides thereof at a height above the primary support member of said transporter and below the predetermined height to which the secondary support member of said transporter can be raised, said shelf member including two separate elongated members spaced from each other by a distance greater than the width of the cargo supporting surface of said secondary support member and less than the width of said cargo; and
(e) means for moving said transporter back and forth along the floor of said cargo storage area between said first and second locations.

6. A system for loading and unloading cargo trailer sections of road vehicles in a ship at dockside comprising:
(a) a cargo transporter including:
(1) a rigid primary support member of general rectangular configuration having opposite sides, front and rear ends and an upper primary supporting surface;
(2) wheel means for carrying said primary support member; said wheel means including pairs of axially aligned wheels spaced longitudinally of said primary support member from one end thereof to the other;
(3) a movable secondary member positioned on the supporting surface of said primary support member and having an upper cargo supporting surface of a width less than the width of said cargo;
(4) lifting means for raising said secondary support member to a predetermined height above said primary support member; said lifting means comprising:
(i) a plurality of ramp members each of which has an upwardly inclined cam surface, said ramp members being rigidly secured to said primary support member and disposed in laterally disposed pairs spaced from each other longitudinally of said primary support member,
(ii) a plurality of cam follower rollers rotatably connected to said secondary support member with each of said rollers being positioned on said secondary support member in rolling contact with the cam surface of one of said ramp members,
(iii) at least one piston-cylinder actuating mechanism comprising a cylinder, a piston reciprocably mounted within said cylinder and a piston rod connected at one end to said piston and having its other end extending out one end of said cylinder, said cylinder being pivotally connected at its other end to said primary support member at a location below and rearwardly of the cam surfaces of one of said pair of ramp members and said piston rod extending forwardly of the transporter beyond the cam surfaces of said one pair of ramp members with its extending end pivotally connected to said secondary support member, and
(iv) selectively operable means for extending and retracting said piston rod to move said cam follower rollers along the cam surfaces of the cooperating ramp members and said secondary support member longitudinally and vertically relative to said primary support member;

(b) a crane located on said dock for lifting said transporter into and out of the cargo storage area of said ship and for loading and unloading carbon onto said transporter when positioned in said cargo storage area;

(c) guide rails positioned on the floor of the cargo storage area of said ship for receiving the wheel means of said transporter, said guide rails extending from a first location in working orientation with said crane to a second location where the cargo is to be stored;

(d) fixed cargo support means in said cargo storage area at said second location for receiving said cargo, said cargo support means including:

(1) a pair of shelf members disposed laterally outwardly of said guide rails on opposite sides thereof at a height above the primary support member of said transporter and below the predetermined height to which the secondary support member of said transporter can be raised, said shelf member including two separate elongated members spaced from each other by a distance greater than the width of the cargo supporting surface of said secondary support member and less than the width of said cargo; and (e) means for moving said transporter back and forth along the floor of said cargo storage area between said first and second locations.

7. A method of loading cargo into the cargo storage area of a ship at dockside wherein a cargo transporter and lifting crane are provided, said method comprising the steps of:

(a) positioning the crane on said dock in working orientation relative to the cargo storage area of said ship;

(b) attaching said crane to said cargo transporter;

(c) lifting said cargo transporter off the dock and into a first location within the cargo storage area of said ship for subsequent movement to a second location within the cargo storage area where the cargo is to be stored;

(d) releasing said transporter from said crane;

(e) attaching said crane to cargo on said dock to be stored in said ship;

(f) lifting said cargo off the dock and positioning it on said transporter located in said first location of the cargo storage area of said ship with the undersurface thereof extending laterally outwardly of the transporter on opposite sides thereof as measured in a direction transverse to the path of movement of said transporter between the first and second locations in said cargo storage area;

(g) moving the loaded transporter from said first location within said cargo storage area to a second location where the cargo is to be stored;

(h) removing said cargo from said transporter and positioning it within said cargo storage area at said second location by:

(1) raising said cargo while still supported on said transporter to a level above spaced, elevated support members fixed in said second location laterally outwardly of the path of movement of said transporter, (2) positioning said raised cargo while still supported on said transporter with its outwardly extending portions of its undersurface in overlying relationship with respect to said fixed support members, (3) lowering said cargo until it is completely supported by said fixed support members, and (4) removing said transporter from underneath said cargo supported on said fixed support members;

(i) returning said transporter to the first location of the cargo storage area of said ship;

(j) repeating the steps set forth in paragraphs (e)–(i) until the ship is loaded with the desired cargo;

(k) attaching the crane to said transporter in the first location of said cargo storage area; and (l) removing said transporter from the cargo storage area of said ship and depositing it on said dock.

8. A method of unloading cargo from the cargo storage area of a ship at dockside wherein a cargo transporter and lifting crane are provided, said method comprising the steps of:

(a) positioning the crane on said dock in working orientation relative to a first location in the cargo storage area of said ship;

(b) attaching said crane to said cargo transporter;

(c) lifting said cargo transporter off the dock and positioning it in said first location of the cargo storage area of said ship;

(d) releasing said cargo transporter from said crane;

(e) moving said transporter from said first location to a second location in the cargo storage area of said ship where cargo is stored;

(f) loading at least a portion of said cargo onto said transporter, each separate portion of said cargo being stored in the second location of said cargo storage area on elevated support members engaging said cargo on the undersurface thereof adjacent its opposite sides, and being transferred from said elevated support members and onto a vertically movable cargo support member provided on said transporter by:

(1) positioning said transporter underneath said portion of cargo, and (2) raising the cargo support member of said transporter into supporting engagement with the undersurface of said portion of cargo intermediate said elevated support members until the weight thereof is transferred to said transporter;

(g) returning the loaded transporter to the first location of the cargo storage area of said ship;

(h) attaching said crane to the cargo on said transporter;

(i) lifting the cargo off said transporter located at said first location and positioning it on said dock;

(j) releasing said cargo from said crane;

(k) repeating the steps set forth in paragraphs (e)–(j) until the desired cargo is unloaded from said ship;

(l) attaching said crane to said transporter in the first location of the cargo storage area of said ship; and (m) removing said transporter from the cargo storage area of said ship and depositing it on said dock.

References Cited

UNITED STATES PATENTS

| | | | |
|---|---|---|---|
| 260,924 | 7/1882 | Bacci | 214—14 X |
| 2,405,893 | 8/1946 | Leftwich | 214—15 |
| 2,440,307 | 4/1948 | Smith | 114—72 |
| 2,963,310 | 12/1960 | Abolins. | |
| 3,331,520 | 7/1967 | Bridge | 214—512 X |
| 3,341,034 | 9/1967 | Blasen | 214—14 |

GERALD M. FORLENZA, Primary Examiner

F. E. WERNER, Assistant Examiner

U.S. Cl. X.R.

214—152

PO-1050
(5/69)

UNITED STATES PATENT OFFICE
CERTIFICATE OF CORRECTION

Patent No. 3,460,686     Dated   August 12, 1969

Inventor(s)   William M. Cole

It is certified that error appears in the above-identified patent and that said Letters Patent are hereby corrected as shown below:

Column 1, line 63,    -  "its"       should read --is--

Column 2, line 66,    -  "single"    should read --simple--

Column 3, line 20,    -  "thea"      should read --the--

Column 3, line 38,    -  "on"        should read --of--

Column 4, line 40,    -  "cas"       should read --can--

Column 5, line 47,    -  "overyling" should read --overlying--

Column 9, line 3,     -  "carbon"    should read --cargo--

SIGNED AND
SEALED
JUN 23 1970

(SEAL)
Attest:

Edward M. Fletcher, Jr.
Attesting Officer

WILLIAM E. SCHUYLER, JR.
Commissioner of Patents